Feb. 27, 1962   F. VAN TETTERODE   3,023,139
METHOD OF STRENGTHENING SHEET GLASS IN
AGITATED LIQUID FLUORIDE BATH
Filed March 11, 1958
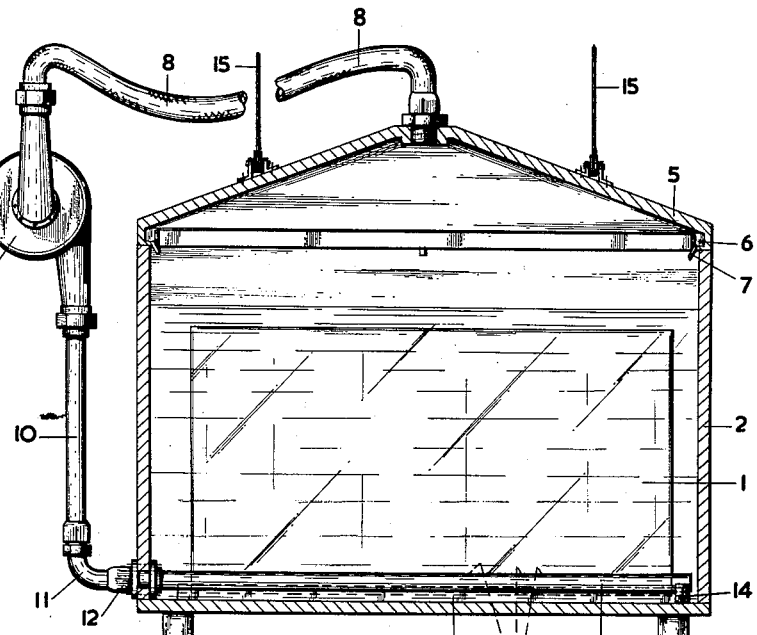
Fig. 1
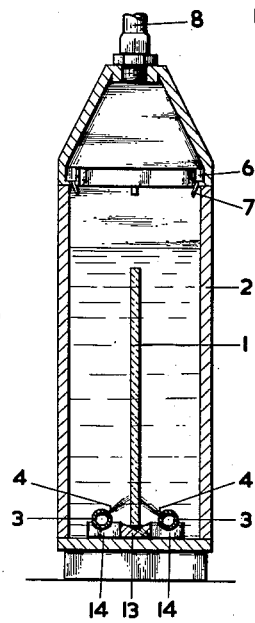
Fig. 2
INVENTOR
FLORIS VAN TETTERODE
BY 
ATTORNEY _United States Patent Office_

3,023,139
Patented Feb. 27, 1962

3,023,139
METHOD OF STRENGTHENING SHEET GLASS IN AGITATED LIQUID FLUORIDE BATH
Floris van Tetterode, Blaricum, Netherlands, assignor to Floris van Tetterode and Jan de Gruil, acting as Glasindustrie F. van Tetterode, Amsterdam, Netherlands
Filed Mar. 11, 1958, Ser. No. 720,604
Claims priority, application Netherlands Mar. 16, 1957
6 Claims. (Cl. 156—24)

This invention relates to a method for the strengthening of sheet glass by subjecting the surface thereof to the action of an etching agent. This invention also relates to a method for further treating such strengthened glass and to window-panes or other glass sheets treated by the application of said method for the strengthening and further treatment of such glass.

It is known to strengthen glass by etching an entire surface thereof somewhat uniformly. Thereby microscopic and also perhaps more coarse imperfections or deficiencies in the surface are removed or flattened out so that they can no more constitute starting points for ruptures. This invention mainly aims at strengthening sheet glass in a much improved manner so that glass is obtained, which has a higher strength than obtainable up to now and which also has better optical conditions, transparency, flatness of surface and polish. Moreover this invention aims at allowing the glass to maintain such properties during a very long time, so that said properties are not lost by minor accidental damages and the like.

In order to obtain these objects a method according to the present invention is first of all characterized in that etching takes place while continuously and considerably moving the etching agent with respect to the glass until a sheet thickness of at least 30 microns has been etched from the glass.

It has appeared that with such a method the strength is increased considerably over the thinner etched off thicknesses as known in practice (e.g. 5 microns if the transparency, polish and flatness of the glass should be maintained somewhat and e.g. 20 microns if such properties are not important).

Contrary to the known method in which no such continuous and considerable movement of the etching agent with respect to the glass is maintained even the etching off of smaller thicknesses gives a considerable decrease in optical conditions and it is not at all possible to etch with the known methods such thicknesses as 30 microns or more. In a more stationary bath of etching agent fluor compositions settle upon the glass so that the etched thickness is not at all uniform, the strength along the surface thereby also varying considerably and thus becoming quite low for the entire glass sheet. It is possible to counteract this somewhat by adding suitable constituents such as sulphuric acid to the etching agent, but the effect thereof is not at all sufficient to overcome the given disadvantages.

In accordance with this invention it is usually possible by maintaining relative movement of the etching agent to obtain the best qualities if a sheet thickness of at least 40 microns is etched off and in most cases even between 70 and 80 microns are to be etched off the glass, which will not at all impair the optical qualities. If more than 80 microns are etched off no further increase of the strength could be obtained. Of course the thickness of the sheet to be etched off will not be made greater than desired for the improvement in strength in view of the time interval and the costs of the etching operation and in view of the thickness of the glass, which causes that with thinner sheets of glass the strength will decrease by further etching in view of the fact that the remaining glass thickness becomes too small. The known methods given above were not at all applicable to glass with a thickness below about ¼", but the present invention is applicable to much thinner glass sheets.

It has appeared that particularly when etching off such thicknesses as more than 30 microns and mainly when etching off between 70 and 80 microns even the smallest injury to the surface of the glass which has been etched nullifies the increase in strength. Thus the invention further proposes to coat the etched surface of the glass after such etching with a protective coating. This also gives an improvement in the resistance of the glass against thermal shocks. In coating the etched glass according to the invention it is an object to obtain a coated glass in which the coating does not at all impair the optical qualities and gives an attractive appearance to the glass.

To obtain these objects it is preferred to coat the glass as etched in the manner given above according to the invention with a layer, which comprises mainly a silicone. It has appeared that this gives the desired properties and even gives a further reinforcement of the glass over the glass which is only etched and not coated.

In general, however, other water soluble or emulsifiable silicones are also suitable if only they give a thin and transparent, normally colourless coating upon the glass and bond intimately thereto.

The composition of the liquid for the coating is preferably such that in pure water from 0.1 to 2% of silicone is dissolved or emulsified, from 0.1 to 6% of an emulsifying agent such as tertiary butylalcohol and if desired further from 0.01 to 2% of polyoxyethylene monostereate for improving the building of a correct and smooth coating layer.

The invention will now be explained further with particular reference to the annexed drawing giving a preferred embodiment of an apparatus for strengthening glass sheets according to the invention.

FIGURE 1 is a vertical section of this apparatus and FIGURE 2 is a vertical section at right angles to the section of FIGURE 1, of the same apparatus.

The sheet of glass 1 is first washed carefully to remove paraffin-like substances and other contaminations which could prevent the etching agent from acting adequately upon the surface.

Thereafter the glass sheet 1 is placed vertically in a bath 2 containing an etching agent.

In said bath there is provided a solution with a strength of 18 to 20% hydrogen fluoride in water, such solution being known as an etching agent, having a temperature of 35° C. The lower part of the bath has two supply ducts 3 with a considerable number of uniformly distributed openings 4 and in the upper part there is a collecting hood 5 above the bath for collecting escaping gas, with a collecting gutter 6 for condensing vapor, preventing such condensate from flowing outwards between hood and bath and returning it into the bath through openings 7. Said hood 5 is connected by a flexible duct 8 such as a rubber lined hose to a small centrifugal pump 9. Said pump 9 is connected by a rigid pipe 10 to a forked pipe elbow 11, dividing the flow passage in the pipe 10 into two passages 12, each communicating with one of the supply ducts 3.

The glass sheet 1 rests on a centering saddle 13 on the bottom of bath 2 and the supply ducts 3 rest on supports 14.

The hood 5 is provided with suspension means 15, connected to suitable hoisting means, not shown.

The bath 2 is filled to the level about as shown with the etching agent. The pump 9 is started and circulates air through pipe 10 to supply ducts 3, where this air leaves the openings 4 as a continuous flow of a large quantity of bubbles. These agitate the etching agent intensively so that the etching takes place not only rapidly, but also uniformly along the entire surface of the glass while maintaining an entirely transparent and smooth surface.

The etching is continued until the desired thickness of the glass, at least 30 microns, has been etched away. During the etching, sludge is formed which when hydrogen fluoride is used as the etching agent comprises siliconfluoride, but the gas bubbles prevent such sludge from spoiling the appearance of the glass and from impairing the uniformity of the etching. The time interval necessary for etching will depend upon the dilution of the etching agent in the bath, upon the desired thickness to be etched off and upon the temperature. With an etching agent and temperature as given above time intervals of 40 to 60 seconds appear to be sufficient with an apparatus as described. The sludge in part settles on the bottom of bath 2 to the sides of the ducts 3 and if there is too much sludge it is ladled out from above between etchings after removal of the hood 5.

The hood 5 rests by its own weight upon the bath 2. No particular seal has to be provided along the line of contact of these parts, so that the bath is about under atmospheric pressure.

The material of the bath and hood should be resistant against the etching agent. Usually wood is used, coated with lead, but it is also possible to use a synthetic polymer such as polyvinylchloride.

The glass sheet does not need further support besides the saddle 13. It will be maintained in a vertical position by the gas bubbles, and in practice it has been seen rocking slowly to and fro.

The bath appears to be boiling. After thus etching off the required thickness the glass sheet is removed from the bath by rubber-gloved hands or rubber-covered hooks, washed and further treated and cleaned, dried and so on in the usual manner and thereafter provided with a coating layer on one or more sides. Whether one or both sides will have to be coated depends upon the destination of the glass sheets. If impacts may act upon the glass from one side only, the surface at which there will only be pressure forces will not have to be coated. If a heat insulating glass is to be made in which there are two layers of glass with a layer of air between them, so that no impact or other forces can act from the inside of the double windowpane it is not necessary to coat any surfaces of the glass at all, as the tensile stresses will act at the surfaces bordering the interior air space, in which no scratching or other injuring of the glass can take place. If the glass is used in such a way that force can act upon the glass from both sides, coating on both sides will be necessary.

Thin sheets of glass, even with a thickness smaller than one tenth of an inch, may be strengthened so that they have a strength against rupture eight times the strength of glass which has not been strengthened in this manner and having the same thickness and surface properties.

In the above example the temperature of the etching agent could also be equal to room temperature, but in that case the etching will take more time. Instead of using a socalled etching agent it is possible to use exclusively a liquid without gas bubbles, but in that case the liquid has to be circulated with a relatively high speed in a closed circuit along the surface of the glass. Small to and fro movements of the glass and alternatively dipping it into and removing it from a bath are in general not sufficient to maintain the desired surface properties of the glass when etching such heavy layers of 30 microns or more.

Experiments have shown that the strengthening is not reduced when the glass is used for long periods of time.

The coating layer may have different compositions. It is possible to use known varnishes in which natural or artificial resins are applied, with a drying agent and the like. Particularly epoxy resins may be used. It is also possible to coat a thicker glass sheet etched according to the invention on both sides by a smaller glass sheet which has been treated in the same manner and which comprises glass of the same thermal coefficient of expansion, which sheets are bonded together. In that case it is not at all necessary to use a further coating layer and the thinner glass sheets are capable of bending without rupture, the thicker inner glass sheet giving the full strengthening effect by being etched according to the invention.

It has, however, appeared to be preferable to use a silicone as the coating composition. Two examples of the applications of such a silicone will now be given:

*Example I*

At a temperature of 35 to 40° C. a glass sheet strengthened in the above given manner by etching is immersed in a liquid comprising distilled water to which are added 0.4% of the silicone, 1% of tertiary butylalcohol and 0.7% of polyoxyethylene-monostearate. After 2 to 3 minutes the glass is removed from the bath and washed immediately, rapidly and thoroughly by a great quantity of warm water. By this treatment the glass sheet is covered with a coating, which bonds quite intimately to the glass. This coating is quite thin (probably only little thicker than molecular) and gives an attractive appearance, said coating protecting the etched glass against scratches and other mechanical injuries.

*Example II*

A glass sheet reinforced by etching in the above given manner is heated to a temperature of between 100 and 150° C. and thereafter is placed for 2 to 6 minutes in a closed zone containing a mist comprising liquid droplets of about 10 microns diameter in air. The droplets comprise distilled water to which 0.2% of the silicone, 0.5% of tertiary butylalcohol and 0.3% of polyoxyethylene-monostearate are added. Thereafter the glass sheet is washed immediately, thoroughly and rapidly by a considerable quantity of warm water.

The same silicone compositions may be used as given in Example I.

Dependent upon the chosen temperatures it is possible to use with a certain quantity of the silicone a greater quantity of butylalcohol as given in the above examples.

It is essential that to the silicone a certain quantity of solving or emulsifying agent be added and agents may also be added for affecting surface tensions and bonding properties of the coating and the glass for obtaining a good bonding, smooth and thin coating.

The best strengthening is obtained when after etching the glass is first thermally cured and is thereafter provided with a silicone layer. In that case it is even possible to obtain a strength some 24 times the strength of the untreated glass. An objection of this sequence is, however, that the manipulation of the glass for the thermal curing requires considerable care. The smallest injury to the glass spoils the reinforcing effect. A safer method is therefore to cover the glass with the silicone layer first and cure it thermally thereafter, in which case however the total reinforcing effect is somewhat smaller.

What I claim is:

1. A method for the strengthening of sheet glass by subjecting the surface thereof to the action of an etching agent, which comprises supporting said glass vertically with its entire surface immersed in a liquid bath including a fluoride etching agent, supplying a gas into the lower portion of said bath on opposite sides of said glass and causing said gas to rise as bubbles uniformly dispersed along both surfaces of said glass for agitating said etching agent, said etching operation is continued until at least thirty microns of glass is removed from the surface thereof.

2. The method set forth in claim 1 in which said gas comprises air.

3. The method set forth in claim 1 in which the gas and any entrained vapors are collected above said bath and are reinforced into said bath as a gas for forming said bubbles.

4. A method of strengthening a sheet of glass by eliminating surface imperfections which constitute incipient points of fracture, which comprises immersing at least one surface of the sheet in a liquid bath including a fluoride etching agent and agitating the liquid in contact with the glass surface to an extent to cause a substantial flow of said liquid over and in contact with said glass surface for a time sufficient to etch the surface of the glass to a depth of at least 30 microns.

5. The process set forth in claim 4 in which from 70 to 80 microns are etched from the surface of the glass.

6. The method set forth in claim 4 in which the etching liquid is circulated at a high speed in a closed circuit along the surface of the glass.

References Cited in the file of this patent

UNITED STATES PATENTS

| | | |
|---|---|---|
| 2,143,796 | Phillips | Jan. 10, 1939 |
| 2,410,300 | Nicoll | Oct. 29, 1946 |
| 2,442,976 | Heany | June 8, 1948 |